Oct. 18, 1960 W. E. ST. CLAIR 2,956,848
BEARING MEMBER
Filed Feb. 3, 1958

INVENTOR.
WILLIAM E. ST CLAIR
BY
Oscar B. Brumback
his
ATTORNEY

United States Patent Office 2,956,848
Patented Oct. 18, 1960

2,956,848

BEARING MEMBER

William E. St. Clair, Pittsburgh, Pa., assignor to Koppers Company Inc., a corporation of Delaware Filed Feb. 3, 1958, Ser. No. 712,972

18 Claims. (Cl. 309—44)

This invention relates generally to compositions for filling the grooves of bearing surfaces and more particularly to compositions for filling the outer groove surfaces of piston rings and to a process for producing such rings and the rings produced thereby.

Piston rings are commonly made with grooves on their outer surfaces, and the grooves can be filled with a material different from the material from which the ring is made. For example, the grooves have been filled with a filler material such as bronze zinc, lead, tin, or graphite which is held in place with a binder such as paraffin or wax. When such rings were used in engines such as diesels where they were subjected to high pressures and temperatures, difficulties have been encountered because the binder deteriorated under these extreme and adverse conditions whereby the filler material became loose in the ring groove.

An object of this invention is to provide a novel composition which is usable for filling the grooves of a piston ring and which will adhere to the ring under adverse operating conditions.

A further object is to provide a novel piston ring of the filled groove type wherein the filler material is bound to the ring with an inflexible, insoluble binder.

A still further object of the invention is to provide a novel process for filling the groove of a piston ring with a material which adheres to the ring under operating conditions of high pressure and temperature.

The present invention contemplates a novel composition suitable for filling the grooves in piston rings and comprising a filler, an epoxy resin, and a curing agent.

In accordance with this invention, the groove of the ring is filled with the foregoing composition, the filled ring is then cured by heat at 350° F. for one hour, air-cooled to room temperature and finished in a suitable manner as by turning. The above seems to be the most advantageous curing temperature and time but obviously other curing arrangements can be used, for example, temperatures of 150° F. having shorter periods of time are suitable and by changing the catalyst a shorter or longer period of time may be used; for instance, with RDGE curing may be at 212° F. for one half hour.

Suitable fillers for use in the composition of this novel invention include various metal powders such as bronze, aluminum, stainless steel, brass, lead, tin and zinc, suitable solid lubricants such as graphite, zinc stearate, mica, fibrous talc, magnesium oleate, calcium palmitate, barium stearate, molybdenum sulfide, aluminum sulfide, and Teflon, and suitable solid porous fillers or combinations of these.

Suitable resins for use in this composition include the Shell Chemical Corporation epoxy resin trademarked EPON 828 and epoxy resins known as Bakelite ERL2774, Dow Resin X–2633.4, Borden's Epiphen Epoxides, Ciba Asaldite 502, Devoe and Raynolds Epi-Rez 510 or polyglycidyl novolak resins or such diapoxides as RDGE (resorcinol diglycidyl ether), described in Uited States Patent No. 2,892,849, "Process For Preparing Epoxyalkyl Aryl Ethers," by William Edward St. Clair, filed November 10, 1955, issued June 30, 1959, and assigned to the assignee of this invention or combinations of these.

Various boron trifluoride-amine complexes may be used as first curing agents, i.e., curing catalysts, such as the Shell Chemical Corporation EPON Curing Agent BF3–400 as well as monoethylamine, triethanolamine, urea, ammonia, piperidine, hexamethylene-tetramine, and phenolic complexes. Other second catalysts for such resins, useful for this purpose include dicyandiamide, cyanamid, melamine, cyanuric chloride, triethanolamine borate, 4,4'-diamino diphenyl sulfone, methylene dianiline, m-phenylene diamine, phthalic anhydride, pyromellitic dianhydride and maleic anhydride. The amount of first catalyst used will vary in the range of 1–10 parts of catalyst per hundred parts of epoxy resin. The amount of second catalyst used will vary from 5–50 parts per hundred parts of epoxy resin. Further, the amounts of catalyst used will depend on the molecular weight of the curing agent, the epoxide value of the epoxy resin, the curing temperature, the degree of heat distoration of the cured material, and the strength of the cured resin desired.

Suitable piston ring materials for use with this novel composition include conventional materials well known in the art such as cast iron and including a Koppers corporation cast iron piston ring material trademarked "K–Iron" but this invention is not limited to piston ring materials and any material suitable for a bearing structure with relatively great load carrying capacity which contains grooves for filling with the filling composition of this invention may be used. Consequently the selection of such bearing materials depends on the conditions for which the bearing structure of this invention is used and the amount of expansion and contraction during operation of the bearing material in relation to the novel composition used as the filling material.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

Figure 1:
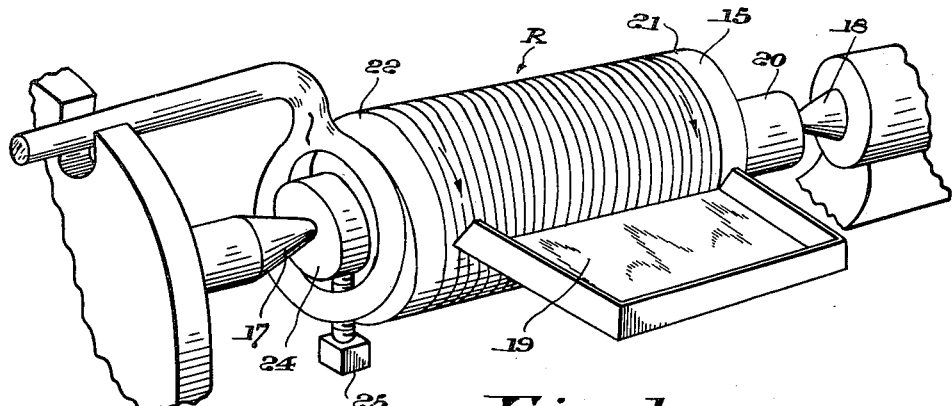
Figure 1 illustrates the apparatus for carrying out the novel process of the invention.
Figure 2:
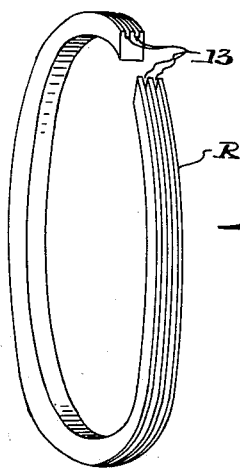
Figure 2 is an isometric view of a typical ring which may be used in the invention.
Figure 3:
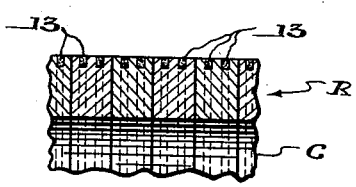
Figure 3 is a section through a plurality of the piston rings made in accordance with this invention.

A conventional type piston ring such as shown in Fig. 1 has a substantially rectangular cross-sectional area and has a groove or grooves 13 around the outer curved periphery and is parted at one side. The portion of the ring is normally open a predetermined distance at the parting when the rings are free, but the parting is substantially closed and the ring is a substantially circular form when the rings are confined as in a cylinder. Usually these rings are made from castings which are machined and finished on their flat sides and rough turned to an oversized dimension with grooves on their outer periphery. These grooves in the rings, which may vary in number, may run from one end of the parting to the other, or in some cases, the grooves may run to a point at distances from the end of parting. In accordance with this invention the grooves of the rings are filled with the novel composition.

Conveniently, according to the invention, a plurality of rings R having grooves as described above are processed at the same time with an apparatus as shown in Fig. 1. The apparatus for carrying out the invention comprises generally an arbor 15 which can be placed in a lathe whose centers 17 and 18 are shown as holding he arbor 15. A trough 19 fills the grooves 13 and removes the excess composition from the rings. The arbor may be of a conventional type having a shaft 20 and spaced about heads 21 and 22 which are disposed on the shaft in conjunction with the cylinder C over which the rings are placed. After placing the rings on the cylinder, the two heads are rotated by a nut 24 or bolt 25 to confine the rings together with the ring parting so that the rings assume a perfect circular form. This particular manner of holding a plurality of rings side by side with the parting closed is conventional. When so centered, the rings are ready for the application of the novel composition of this invention to the rings so as to fill the grooves.

An example of the novel composition for filling of the grooves of piston rings is bronze-graphite powder in the amount of 3 parts by weight and prepared resin in the amount of 1 part by weight. The bronze-graphite powder consists of Metals Distengrating Company Bronze MD8802 in the amount of 4 parts by volume and Dixon Corporation Microfyne Graphite in the amount of 1 part by volume. The prepared resin consists of Shell Chemical Corporation epoxy resin Epon 828 in the amount of 100 parts by weight and Shell Chemical Corporation EPON Curing Agent BF3–400 in the amount of 3 parts by weight. The Epon 828 is a pourable liquid at room temperature and is widely used in wet lay-up laminating casting and the potting of electrical equipment, and in forming adhesives for bonding such materials as wood, plastics, metal, and glass to themselves and to each other. Epon 828 has a viscosity at 25° C. of 100–160 poises an epoxide equivalent of 175–210 grams of resin containing one gram-equivalent of epoxide. Such resins as Epon 828 are of a predetermined molecular weight and the chemical structure of a typical molecule of Epon resin is as follows:

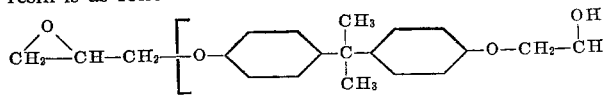
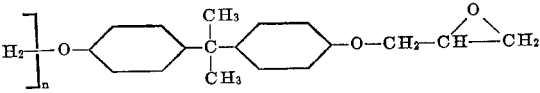

The EPON Curing Agent BF3–400 is solid at room temperature and has been developed to cause controlled polymerization of resins such as Epon 828. For small batches, three parts of the curing agent can be stirred into 100 parts of warmed (185° F.) Epon 828 on a hot plate.

When preparing the filling material mix approximately 50% of the bronze graphite powder with the total amount of prepared resin. After mixing to a uniform consistency, the balance of the bronze-graphite powder is added and mixed thoroughly until the entire mixture has a uniform texture without lumps. The constituents are heated while mixing to a temperature of about 150° F., care being taken to avoid the entrapment of air in the mixture. The vessel for this heating and mixing may be of glass, porcelain, or stainless steel.

In the application of the filling material to the rings, the arbor is rotated by a lathe at a suitable rate such as between 10 and 20 r.p.m. The novel composition is placed in the applicator, such as shown in Fig. 1, and the material applied to the curved rings turning on the lathe. The applicator should be mounted on the lathe with its lower edge about ½″ below the arbor centers and fixed parallel to the outside surface of the rings. After the rings are filled, the arbor is removed from the lathe and as soon as possible placed in an oven preheated to about 350° F. The arbor is maintained at this temperature in the oven for about one hour and air-cooled to room temperature. After cooling, the rings are finished as by being placed in a lathe and finish turned to the desired diameter. During the period between the filling and the curing, it is desirable not to dispose the arbor to a temperature in excess of 90° F. to avoid the filling becoming thin and running out of the grooves. The arbor should be placed on end after the filling and during the curing so that the grooves are horizontal to avoid distoration of the filling.

This novel composition has a pot life of approximately three weeks, but it has been found desirable, however, to use these constituents within three to five days of their mixing. The filling mixture should be stirred before each use.

The foregoing rings made in the manner described have been found to wear for a long period of time in engines such as diesel engines where high temperatures are encountered without great additions of lubrication. The filled rings of this invention do not show tendencies towards scoring the walls and show characteristics of long wearing.

Although the foregoing has illustrated and described the invention in detail, it is to be expressly understood that the invention is not limited thereto. Various changes can be made in the design and arrangement of the parts without departing from the spirit and the scope of the invention as will now be understood by those skilled in the art.

What is claimed is:

1. A composition for filling grooves in the bearing face of a metallic piston ring which consists essentially of a non-abrasive mixture of bronze and graphite powders, an epoxy resin and a curing agent that causes controlled polymerization of the epoxy resin, said mixture of bronze and graphite powders being present in a major proportion, said epoxy resin and curing agent being present in a minor proportion, and from 1–50 parts of said curing agent being present per 100 parts of said epoxy resin.

2. A composition for filling grooves in the bearing face of a metallic piston ring which consists essentially of a non-abrasive mixture of about twelve parts of bronze powder and three parts of graphite powder, and a binder consisting essentially of an epoxy resin having incorporated therein about 3% of a curing agent that causes controlled polymerization of the epoxy resin, said mixture of bronze powder and graphite powder being present in a major proportion, and said epoxy resin and curing agent being present in a minor proportion.

3. A metallic piston ring having grooves in its bearing face therein filled with the composition of claim 1.

4. A process of producing a metallic piston ring having grooves in its bearing face which comprises, filling the grooves with a non-abrasive mixture of bronze and graphite powders prepared with an epoxy resin and a curing agent for causing controlled polymerization of the epoxy resin, thereafter maintaining the temperature of the ring at about 350° F. for an hour, air-cooling the ring to room temperature, and finishing the surface of the ring.

5. A composition for filling groove surfaces in the bearing face of metallic piston rings which consists essentially of a filler in the amount of 3 parts by weight having a non-abrasive powdered metal and a solid lubricant, and a prepared binder in the amount of one part by weight having an epoxy resin with an epoxide equivalent of 175–210 grams of resin containing one gram equivalent of epoxide and a boron trifluoride curing catalyst that causes controlled polymerization of the epoxy resin, from 1–50 parts of said curing agent being present per 100 parts of said epoxy resin.

6. A composition for filling groove surfaces in the bearing face of metallic piston rings which consists essentially of a filler having four parts by volume bronze powder and one part by volume graphite powder, and a binder having 100 parts by weight epoxy resin which is pourable at room temperature and which has an epoxide equivalent of 175–210 grams and three parts by weight of a boron trifluoride curing catalyst that causes controlled polymerization of the epoxy resin, said filler being present in a major proportion and said epoxy resin and curing catalyst being present in a minor proportion.

7. A composition for filling groove surfaces in the bearing face of metallic piston rings which consists essentially of a prepared filler having four parts by volume bronze powder and one part by volume graphite powder, and a prepared binder having 100 parts by weight of an epoxy resin which has a viscosity of 100–160 poises at 25° C. and one gram equivalent weight of epoxide to 175–210 grams of resin and three parts by weight of a boron trifluoride curing catalyst that causes controlled polymerization of said epoxy resin, said filler being present in a major proportion and said epoxy resin and curing catalyst being present in a minor proportion.

8. In a process for producing a composition for applying to groove surfaces in the bearing face of a metallic piston ring the steps of mixing an epoxy resin which is pourable at room temperature with a boron trifluoride curing agent that causes controlled polymerization of the epoxy resin, said mixing being at temperatures not exceeding 150° F. to form a prepared resin, mixing a bronze powder with a graphite powder, mixing the bronze-graphite mixture with the prepared resin to form a composition of uniform pliable texture, uniformly applying said composition into said grooves and holding the piston rings with said composition applied thereto at 350° F. for one hour so that said composition forms a rigid uniform mass which is firmly bonded to said piston rings.

9. In a process for producing metallic piston rings having grooves in their bearing faces the steps of mixing an epoxy resin which is pourable at room temperature with a boron trifluoride curing agent that causes controlled polymerization of the epoxy resin, said mixing being at temperatures not exceeding 150° F. to form a prepared resin, mixing a bronze powder with a graphite powder, mixing the bronze-graphite mixture with the prepared resin until it forms a composition of uniform pliable texture, applying said composition to the bearing surfaces of said bearing members so as to fill the grooves in said bearing faces which are rotated by a lathe, holding the bearing members with said composition applied thereto at 350° F. for one hour, air-cooling said bearing member and said bonded mass to room temperature so that said composition forms a uniform mass which is securely bonded to the bearing members, and finishing said bearing members and said bonded mass so that the bearing faces of said finished bearing members are wear resistant at conditions of high temperature and pressure.

10. A metallic bearing made by the process of claim 9.

11. A metallic bearing member with grooves in its bearing face made with the composition of claim 7 filled in said grooves.

12. A metallic piston ring having its bearing face provided with a plurality of closely spaced small, narrow, restricted bearing areas separated by grooves and material filling said grooves, said material consisting essentially of a powdered filler of graphite and bronze which are bonded to each other and to said bearing member by an epoxy resin having a viscosity of 100–160 poises at 25° C. and a boron trifluoride curing agent that causes controlled polymerization of said epoxy resin so that said material adheres to said bearing member under extreme conditions of temperature and pressure such as are encountered in internal combustion engines, said powdered filler being present in a major proportion, said epoxy resin and curing agent being present in a minor proportion, and from 1–50 parts of said curing agent being present per 100 parts of said epoxy resin.

13. A metallic piston ring with grooves in its bearing face and having a composition bonded in said grooves which consists essentially of a non-abrasive powdered filler, an epoxy resin, and a curing agent that causes controlled polymerization of said epoxy resin for bonding said composition into a uniform solid mass and for bonding said composition to said bearing member so that said bearing member and said composition bonded thereto operate under extreme conditions of temperature and pressure such as are encountered in internal combustion engines, said powdered filler being present in a major proportion, said epoxy resin and curing agent being present in a minor proportion, and from 1–50 parts of said curing agent being present per 100 parts of said epoxy resin.

14. A metallic piston ring with grooves in its bearing face and having a composition bonded in said grooves which consists essentially of a non-abrasive metallic filler, a solid lubricant and a bonding agent having an epoxy resin with a viscosity of 100–160 poises at 25° C. and a one gram equivalent weight of epoxide to 175–210 grams of resin and a boron trifluoride curing agent that causes controlled polymerization of said epoxy resin so that said composition is permanently bonded in a solid uniform mass to said bearing member, said filler being present in a major proportion, said epoxy resin and curing agent being present in a minor proportion, and from 1–50 parts of said curing agent being present per 100 parts of said epoxy.

15. A process for producing a metallic piston ring having grooves in its bearing face comprising filling said grooves with a material consisting essentially of a finely divided filler mixed with an epoxide having a curing agent for the epoxide, and maintaining said ring at a temperature which causes controlled polymerization of said epoxide whereby said epoxide bonds with said filler and said piston ring in said grooves.

16. A metallic piston ring comprising an annular metallic element having a bearing face with grooves therein, a finely divided filler in said grooves, and an epoxide bonded to said filler and metallic element in said grooves, said finely divided filler being present in a major proportion, and said epoxide being present in a minor proportion.

17. A metallic piston ring comprising an annular metallic element having a bearing face with grooves therein, a finely divided solid filler in said grooves, and an epoxide forming a bond with said filler and said metallic element in said grooves, said filler being present in a major proportion, said epoxide being present in a minor proportion, and said epoxide consisting essentially of an epoxide and a curing agent that causes controlled polymerization of said epoxide in the amount of from 1–50 parts curing agent per 100 parts of epoxide so as to cause controlled polymerization of said epoxide to form said bond.

18. A metallic piston ring comprising an annular metallic element having a bearing face with grooves therein, a finely divided filler in said grooves, an epoxide, and a curing agent joined with said epoxide to form a bond between said epoxide, filler and metallic element in said grooves, said filler being present in a major proportion, said epoxide being present in a minor proportion, and from 1–50 parts of said curing agent being present per 100 parts of said epoxide.

References Cited in the file of this patent

UNITED STATES PATENTS

| Number | Name | Date |
| --- | --- | --- |
| 1,054,265 | Baekeland | Feb. 25, 1913 |
| 1,949,135 | Wirth | Feb. 27, 1934 |
| 1,973,043 | Bragg | Sept. 11, 1934 |
| 2,187,626 | Merriman | Jan. 16, 1940 |
| 2,268,869 | Given | Jan. 6, 1942 |
| 2,276,143 | Bell | Mar. 10, 1942 |
| 2,338,558 | Wickwire | Jan. 4, 1944 |
| 2,368,172 | Taber | Jan. 30, 1945 |
| 2,470,264 | Richardson | May 17, 1949 |
| 2,528,934 | Wiles | Nov. 7, 1950 |
| 2,568,274 | Clark | Sept. 18, 1951 |
| 2,581,301 | Saywell | Jan. 1, 1952 |
| 2,773,048 | Formo et al. | Dec. 4, 1956 |